United States Patent
Papadimitriou

(10) Patent No.: US 9,794,166 B2
(45) Date of Patent: Oct. 17, 2017

(54) METHOD AND SYSTEM FOR IMPROVED ROUTING

(75) Inventor: Dimitri Papadimitriou, Brussels (BE)

(73) Assignee: Alcatel Lucent, Boulogne-Billancourt (FR)

( * ) Notice: Subject to any disclaimer, the term of this patent is extended or adjusted under 35 U.S.C. 154(b) by 1268 days.

(21) Appl. No.: 13/515,455

(22) PCT Filed: Dec. 20, 2010

(86) PCT No.: PCT/EP2010/070254
§ 371 (c)(1),
(2), (4) Date: Jun. 12, 2012

(87) PCT Pub. No.: WO2011/080143
PCT Pub. Date: Jul. 7, 2011

(65) Prior Publication Data
US 2012/0254465 A1  Oct. 4, 2012

(30) Foreign Application Priority Data

Jan. 4, 2010 (EP) ..................................... 10305003

(51) Int. Cl.
*G06F 15/173* (2006.01)
*H04L 12/721* (2013.01)
*H04L 12/751* (2013.01)

(52) U.S. Cl.
CPC .............. *H04L 45/14* (2013.01); *H04L 45/02* (2013.01)

(58) Field of Classification Search
CPC ................................ H04L 45/14; H04L 45/02
USPC ......................................................... 709/242
See application file for complete search history.

(56) References Cited

U.S. PATENT DOCUMENTS

| 7,945,658 | B1 * | 5/2011 | Nucci et al. | 709/224 |
|---|---|---|---|---|
| 8,018,953 | B1 * | 9/2011 | Zhao | 370/400 |
| 2002/0181402 | A1 * | 12/2002 | Lemoff et al. | 370/238 |
| 2005/0025118 | A1 * | 2/2005 | Hao et al. | 370/351 |
| 2005/0073958 | A1 * | 4/2005 | Atlas | H04L 45/00 370/238 |
| 2005/0286412 | A1 * | 12/2005 | Hao et al. | 370/216 |

(Continued)

OTHER PUBLICATIONS

Papadimitriou et al., Implementation of Techniques that Improve the Scalability and the Quality of the Routing System, [online], Oct. 2009, whole document, [retrieved on Feb. 23, 2015]. Retrieved from the Internet:<URL:http://www.ecode-project.eu/pmwiki/uploads/Ecode/ECODE%20D36-v1.0.pdf>.*

(Continued)

*Primary Examiner* — Philip Chea
*Assistant Examiner* — Wing Ma
(74) *Attorney, Agent, or Firm* — Harness, Dickey & Pierce, P.L.C.

(57) ABSTRACT

Method for use in updating a routing table of a router of a plurality of routers, said routing table comprising the route(s) to be used for at least one destination, wherein update messages with routing information are sent between said plurality of routers, typically BGP routers, wherein the following steps are performed at the router: receiving of an update message containing a path or a withdrawal of a path for a destination; determining if the (withdrawn) path is associated with a path exploration event; deciding on the updating of the routing table taking into account the result of the determination.

10 Claims, 5 Drawing Sheets

(56) References Cited

U.S. PATENT DOCUMENTS

| | | | |
|---|---|---|---|
| 2006/0167784 A1* | 7/2006 | Hoffberg | G06Q 20/401 705/37 |
| 2008/0130645 A1* | 6/2008 | Deshpande et al. | 370/392 |
| 2009/0086741 A1* | 4/2009 | Zhang | H04L 41/5009 370/401 |
| 2010/0150020 A1* | 6/2010 | Rosen et al. | 370/254 |

OTHER PUBLICATIONS

Anthony Lambert et al. 2009. Improving internet-wide routing protocols convergence with MRPC timers. In Proceedings of the 5th international conference on Emerging networking experiments and technologies (CoNEXT '09). ACM, New York, NY, USA, 325-336. Retrieved from the Internet<URL:http://dl.acm.org/citation.cfm?id=2464253>.*

Huston, G. et al., "A Technique for Reducing BGP Update Announcements through Path Exploration Damping," in Selected Areas in Communications, IEEE Journal on , vol. 28, No. 8, pp. 1271-1286, Oct. 2010. <URL: http://ieeexplore.ieee.org/stamp/stamp.jsp?tp=&arnumber=5586440&isnumber=5586433>.*

Wang Lijun; Wu Jianping; Xu Ke, "Utilizing Route Correlation to Improve BGP Routing Convergence," in Telecommunications, 2007. ConTel 2007. 9th International Conference on , vol., No., pp. 211-218, Jun. 13-15, 2007. <URL: http://ieeexplore.ieee.org/stamp/stamp.jsp?tp=&arnumber=4267500&isnumber=4267457>.*

Gardiner, J.D., "Multiple Markov Models for Detecting Internet Anomalies from BGP Data," in DoD High Performance Computing Modernization Program Users Group Conference (HPCMP-UGC), 2009 , vol., No., pp. 374-377, Jun. 15-18, 2009. <URL: http://ieeexplore.ieee.org/stamp/stamp.jsp?tp=&arnumber=5729492&isnumber=5729430>.*

Mao et al., "Route flap damping exacerbates internet routing convergence," in SIGCOMM '02 Proceedings of the 2002 conference on Applications, technologies, architectures, and protocols for computer communications, pp. 221-233, Oct. 2002. <URL: http://http://dl.acm.org/citation.cfm?id=633047>.*

A. Oveissian, K. Salamatian, A. Soule and N. Taft, "Fast flow classification over Internet," Proceedings. Second Annual Conference on Communication Networks and Services Research, 2004., 2004, pp. 235-242. Retrieved from the Internet: <URL:http://ieeexplore.ieee.org/stamp/stamp.jsp?tp=&arnumber=1344733&isnumber=29617>.*

Chandrashokar J et al: "Limiting path exploration in BGP", INFOCOM 2005. 24th Annual Joint Conference of the IEEE Computer and Communications Societies. Proceedings IEEE Miami, FL, USA, Mar. 13-17, 2005. IEEE, Piscataway, NJ, USA, LNKD-DOI:10.1109/INFCOM.2005.1498520, vol. 4, Mar. 13, 2005 (Mar. 13, 2005), pp. 2337-2348, XP010829247, ISBN: 978-0-7803-8968-7, p. 2, left-hand column, line 6—p. 8, right-hand column, line 5.

Beichuan Zhang et al: "Timer Interaction in Route Flap Damping", Distributed Computing Systems, 2005, ICDCS 2005, Proceedings, 25th IEEE International Conference on, Columbus, OH, USA, Jun. 6-10, 2005, Piscataway, NJ, USA, IEEE LNKD- DOI:10.1109/ICDCS.2005.81, Jun. 6, 2005 (Jun. 6, 2005), pp. 393-403, XP010807982, ISBN: 978-0-7695-2331-6, the whole document.

Zhenhai Duan et al: "Damping BGP route flaps", Performance, Computing, and Communications, 2004 IEEE International Conference on, Phoenix, AZ, Apr. 15-17, 2004. IEEE, Piscataway, NJ, USA, Apr. 15, 2004 (Apr. 15, 2004), pp. 131-138, XP010770054, ISBN: 978-0-7803-8396-8, the whole document.

Moghanjoughi A A et al: "QoS based Fair Load-Balancing: Paradigm to IANRA Routing Algorithm for Wireless Networks (WNs)", Computer and Information Technology, 2008, ICCIT 2008, 11th International Conference on, IEEE, Piscataway, NJ, USA, Dec. 24, 2008 (Dec. 24, 2008), pp. 104-109, XP031443021, ISBN: 978-1-4244-2135-0, the whole document.

Botta A et al: "An approach to the identification of network elements composing heterogeneous end-to-end paths", Computer Networks, Elsevier Science Publishers B.V., Amsterdam, NL, LNKDDOI: 10.1016/J.COMNET.2008.06.015. vol. 52, No. 15, Oct. 23, 2008 (Oct. 23, 2008), pp. 2975-2987, XP025433322, ISSN: 1389-1286 [retrieved on Jul. 2, 2008] the whole document.

* cited by examiner

STATE OF THE ART

| Adj-RIB-In | | Loc-RIB | Adj-RIB-Out |
|---|---|---|---|
| $t_2$ | [2;D] | [2;D] | [1,2;D] |
| $t'_5$ | [3,2;D] | [2;D] | " |
| $t_5$ | W [2,D] | [3,2,D] | [1,3,2,D] / W [ 1,2;D] |
| $t'''_7$ | [4,3,2;D] | [3,2;D] | " |
| $t'_7$ | W [3,2;D] | [4,3,2;D] | [1,4,3,2,D] / W [ 1,3,2;D] |
| $t_{10}$ | W [4,3,2;D] | none | W [1,4,3,2;D] |

STATE OF THE ART

FIG. 2

| Adj-RIB-In | | Loc-RIB | Adj-RIB-Out |
|---|---|---|---|
| $t_2$ | [2;D] | [2;D] | [1,2;D] |
| $t'_5$ | [3,2;D] | [2;D] | [1,2;D] |
| $t_5$ | W [2,D] | none | W [1,2,D] |
| $t'''_7$ | [4,3,2;D] | none | none |
| $t'_7$ | W [3,2;D] | none | none |
| $t_{10}$ | W [4,3,2;D] | none | none |

FIG. 3

| Adj-RIB-In | Loc-RIB | Adj-RIB-Out |
|---|---|---|
| [2;D] | [2;D] | [1,2;D] |
| [3,2;D] | [2;D] | |
| [4,3,2,D] | [3,2,D] | |
| [5,4,3,2;D] | [3,2,D] | |
| [6,7,8,9;D] | [4,3,2;D] | |

FIG. 4B: LEARNING

| Adj-RIB-In | Loc-RIB | Adj-RIB-Out |
|---|---|---|
| [2;D] | [2;D] | [1,2;D] |
| [3,2;D] | | W [1,2;D] |
| [4,3,2,D] | [3,2,D] | [1,3,2;D] |
| [5,4,3,2;D] | | W [1,3,2;D] |
| [6,7,8,9;D] | [6,7,8,9;D] | [6,7,8,9] |

METHOD AND SYSTEM FOR IMPROVED ROUTING

TECHNICAL FIELD

The present invention relates to a method for use in updating a routing table of a router of a plurality of routers, for improving the routing system convergence. The invention also relates to a router, typically a BGP router.

BACKGROUND

Path exploration is an intrinsic phenomenon associated to any path-vector routing protocol. Many efforts have been spent over the last decade to quantify and mitigate its detrimental effects. There are basically three classes of approaches to mitigate its effects:
root cause notification to perform an informed AS-path selection or to annotate the AS paths with additional "path dependency" information;
shorten MRAI time to fasten convergence: however, decreasing the MRAI below a certain threshold leads to adversary effects in terms of convergence time and number of BGP updates, and thus exacerbates path exploration phenomenon.
Backup/Multi AS-path (increase AS-Path diversity): this solution affects the number of RIB states to be maintained and thus results in adversary effects on routing scalability.

SUMMARY

The object of the invention is to provide a method and system allowing reducing the routing convergence time in a reliable way.

According to an embodiment of the invention there is provided a method for use in updating a routing table of a router of a plurality of routers, said routing table comprising the route(s) to be used for at least one destination, wherein the following steps are performed at the router:
receiving of an update message containing a path or a withdrawal of a path for a destination;
determining if the (withdrawn) path is associated with a path exploration event;
deciding on the updating of the routing table taking into account the result of the determination.

By detecting if a received update message contains a new path or a withdrawal of a path, which is part of the exploration process, and making the decision process dependent on this detection, convergence time can be reliably reduced.

In the present application path exploration can be defined as a phenomenon which typically occurs when a destination is first advertised or when a destination is withdrawn in a network. This is due to different propagation/processing delays across the node topology often resulting into a suboptimal selection of transient paths until the next optimal path is being selected. Note that in case of a withdrawal, it may happen that there is no longer a path to the destination.

According to an embodiment of the invention there is provided a technique to detect the path exploration phenomenon in BGP update sequences (modelled as sequences of AS-path sequences) and accelerate the BGP selection process so as to eliminate the detrimental effects of path exploration on BGP convergence time.

According to a preferred embodiment the path exploration event is associated with a number of non-optimal transient paths, and the longest contiguous path sequence of the transient paths, is identified. The deciding on the updating of the routing table will then also take into account said identified sequence for determining whether a path contained in an update message should be selected.

According to a preferred embodiment, if the update message advertises a new path and it is determined that the new path is associated with a path exploration event, the deciding comprises not including the new path in the routing table.

Further the method preferably also comprises deciding on routing information to be included in update messages to be sent to other routers, taking into account the result of the determination, wherein a new path is not included in update messages to be sent to other routers if it is determined that the new path is associated with a path exploration event.

According to a preferred embodiment the determining uses a generative stochastic signal model, and preferably a Hidden Markov Model (HMM). Generative stochastic models have the advantage that they allow to exploit observations, wherein in the present case the observations comprise the topological information such as the information derived from the update messages. It is noted that a HMM discriminative equivalent, named Conditional Random Field (CRF), can also be used. However, usually CRF will be a less suitable model because it is not easy to incorporate the unlabeled data, and typically a lot of training data is needed for the CRF to achieve good performance accuracy.

According to a further developed embodiment thereof the model uses a plurality of states to model a plurality of communication channels, said plurality of communication channels having outputs being used for selecting the path to be used for the destination; and wherein the received update messages and information in the routing table are used provide probabilistic data on the states. If a HMM model is used, the HMM preferably comprises:
a number N of preferably at least 4 hidden states $S_i$ with $1 \leq i \leq N$, said number of hidden states characterizing routing states of a group of routers upstream of the router, which group is associated with a path exploration event;
a number M of observation symbols O per hidden state, said observation symbols corresponding to the path sequences received in the update messages;
a state transition probability distribution $a_{ij}=P(q_{j,t+1}|q_{i,t})$ with $1 \leq i, j \leq N$;
wherein $P(q_{j,t+1}|q_{i,t})$ is the probability that the actual state at time t+1 is equal to $S_j$, and that the preceding actual state at time t was $S_i$ at time t;
an observation probability distribution in state j, $b_j(O)=P(O_t|q_{j,t})$ with $1 \leq j \leq N$, $P(O_t|q_{j,t})$ being the probability of emitting the observation O at time t in the actual state $q_j$ at time t.
an initial state distribution $\pi_i=P(q_{i,1})$ with $1 \leq i \leq N$, $P(q_{i,1})$ being the probability of having an initial state $S_i$. The number of states to be used is typically four or five. Possible states and observation symbols will be further explained in the detailed figure description below.

In the case where the router is a BGP router having a number of peers and a Routing Information Base (RIB), this RIB typically comprises:
an Adj-RIBs-In part storing routing information from inbound update messages;
a Loc-RIB part storing the routing table, i.e. the selected routes, and
an Adj-RIBs-Out part storing the routing information to be included in update messages to be sent to its BGP peers; wherein the path sequence of the received update message is stored in the Adj-RIBs-In part;

wherein the Loc-RIB part and the Adj-RIBs-Out part are updated taking into account the result of this determination.

Further, the invention relates to a router, typically a BGP router, having a routing table comprising the route(s) to be used for at least one destination, wherein the router is adapted to send and receive update messages with routing information, comprising:

receiving means for receiving an update message containing for a destination a path or a withdrawal of a path;

determining means for determining if the (withdrawn) path is associated with a path exploration event;

decision means in communication with the determining means for deciding on the updating of the routing table taking into account the result of the determination.

According to a preferred embodiment the determining means comprise a stochastic modeling means, preferably a HMM modeling means adapted to function according to any of the above disclosed embodiments of the used model.

According to a further developed embodiment the router is a BGP router, the routing table (Loc-RIB) is part of the RIB, and the RIB further comprises an Adj-RIB-In for storing the received announced (withdrawn) path for the destination, and an Adj-RIB-Out; wherein, the decision means are adapted for not storing a new path or a withdrawal of a path in the Loc-RIB and in the Adj-RIB-Out if the new path or the withdrawal is associated with a path exploration event.

The accompanying drawings are used to illustrate presently preferred non-limiting exemplary embodiments of the present invention. The above and other advantages or features and objects of the invention will become more apparent and the invention will be better understood from the following detailed description when read in conjunction with the accompanying drawings in which:

FIGS. 1A-C are topology graphs illustrating path exploration in a routing system of the prior art;

FIG. 2 illustrates the content of the Routing Information Base (RIB) for the example of FIGS. 1A-C, when using the method of the prior art;

FIG. 3 illustrates the content of the Routing Information Base (RIB) for the example of FIGS. 1A-C, when using an embodiment of the method of the invention;

Figures 4A, 4C:
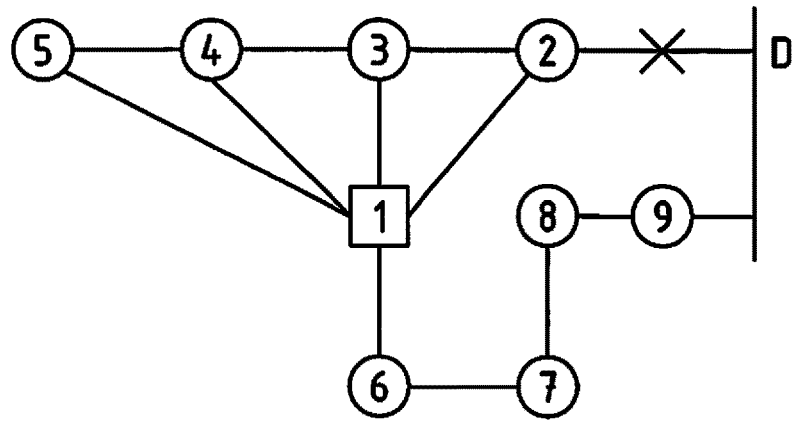
Figure 5:
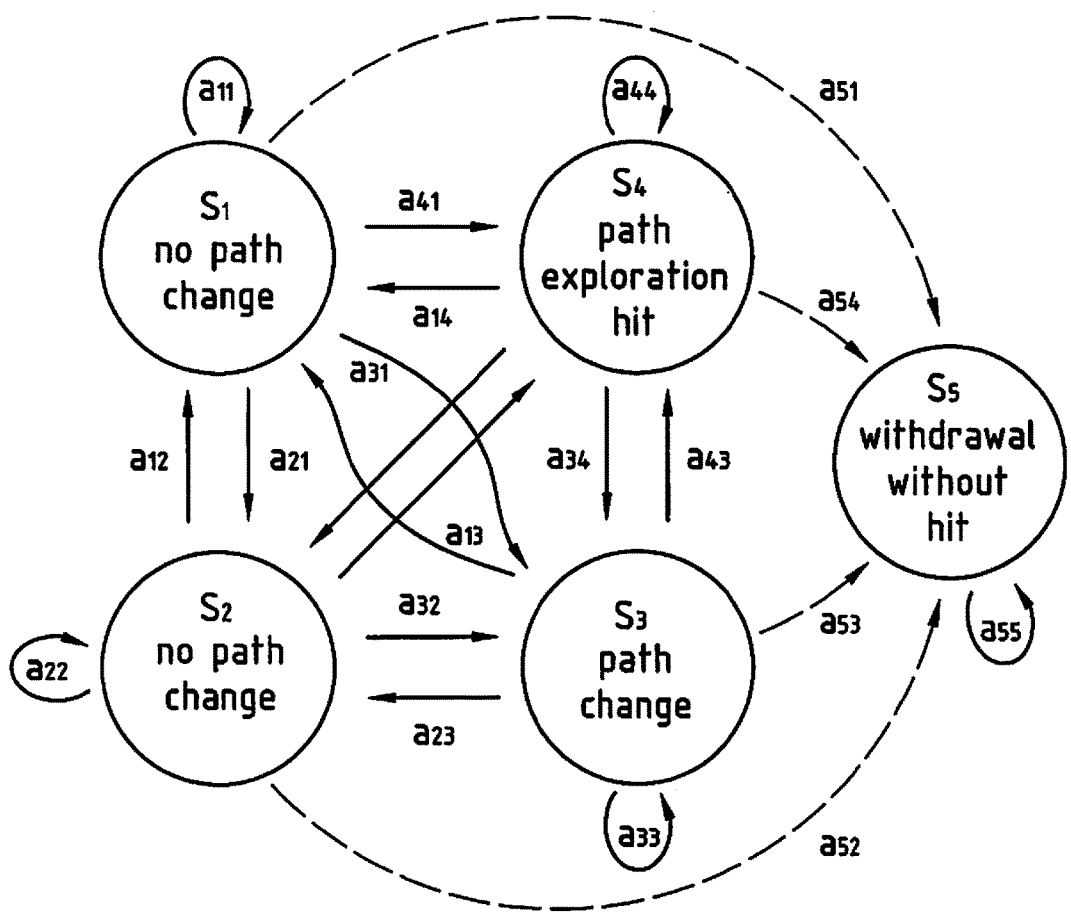
Figure 6:
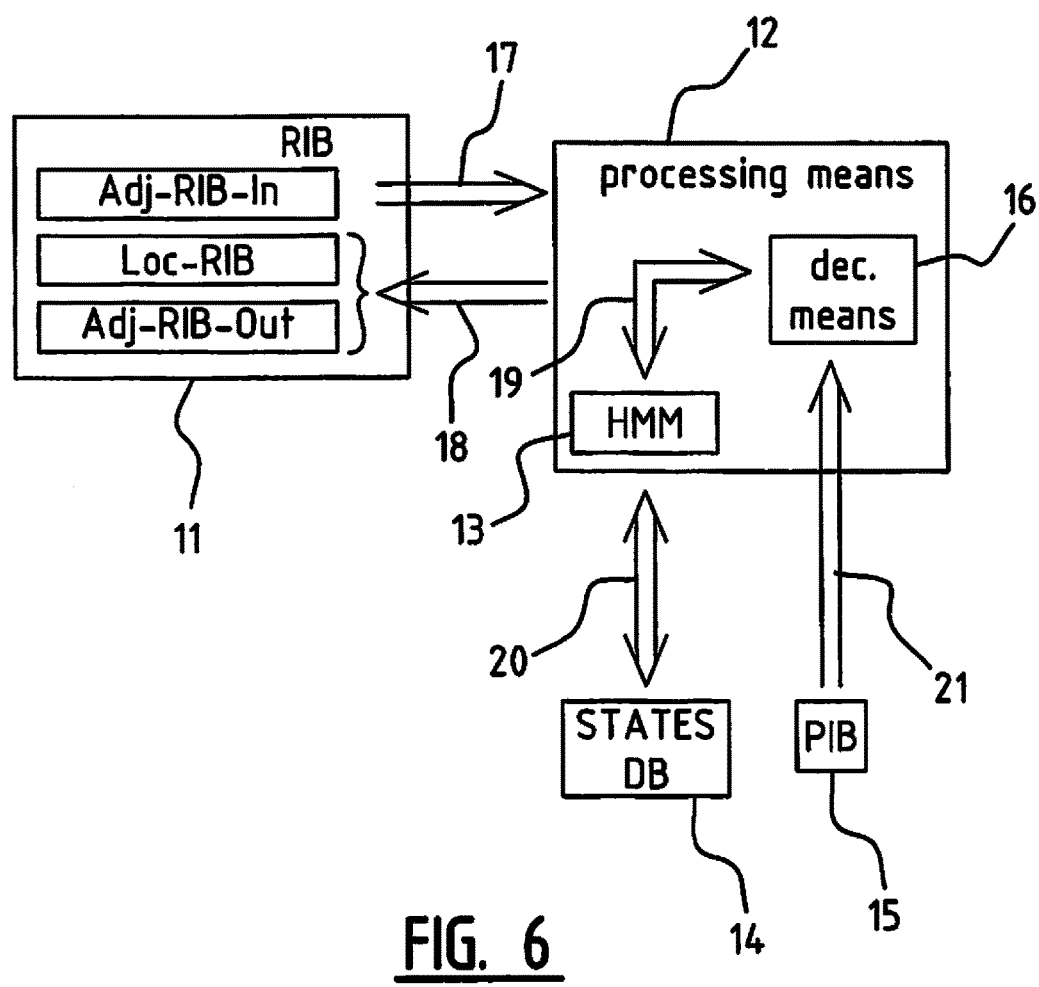

FIGS. 4A-C illustrate an embodiment of the method of the invention applied on a network with a second exemplary topology shown in FIG. 4A;

FIG. 5 illustrates an embodiment of a HMM used for detecting a path exploration event;

FIG. 6 is a schematic view of an embodiment of a router of the invention.

According to a currently preferred embodiment of the invention the Border Gateway Protocol (BGP) is used for updating the routing information in a router. BGP is discussed in Request for Comments (RFC) 4271 (http://www.ietf.org/rfc/rfc4271) which is incorporated herein by reference. BGP is a routing protocol of the Internet, maintaining a table of IP networks or prefixes which designate network reachability among Autonomous Systems (ASs). BGP is an Internet inter-domain/inter-AS routing protocol. A route is defined as a unit of information that pairs a set of destinations with the attributes of a path to these destinations. Routes (network reachability information) are advertised between BGP routers in UPDATE messages. This network reachability information includes information on the list of Autonomous Systems that reachability information traverses. More in particular, the actual path to the set of destinations is the information reported in the AS_Path attribute that enumerates the sequence of AS numbers that the reachability information has traversed through BGP UPDATE messages. This information will be sufficient for constructing a graph of AS connectivity, i.e. the AS routing topology, from which routing loops may be detected and avoided.

Routes are stored in the Routing Information Base (RIBs) consisting mainly of the Adj-RIBs-In, the Loc-RIB, and the Adj-RIBs-Out. The Adj-RIBs-In stores routing information learned from inbound UPDATE messages that were received from other BGP speakers. Their contents represent routes that are available as input to the Decision Process. The Loc-RIB contains the local routing information the BGP speaker selected by applying route selection rules and local policies to the routing information contained in its Adj-RIBs-In. These are the routes that will be used by the local BGP speaker. The Adj-RIBs-Out stores information the local BGP speaker selected for advertisement to its peers. The routing information stored in the Adj-RIBs-Out will be advertised to its peers via UPDATE messages. If the UPDATE message contains a non-empty WITHDRAWN ROUTES field, the previously advertised routes, whose destinations are contained in this field, shall be removed from the Adj-RIB-In. The BGP speaker will then run its Decision Process because the previously advertised route is no longer available for use. If the UPDATE message contains a feasible route, the Adj-RIB-In will be updated with this route, which can be a replacement or an addition in case of a new route not already stored in the Adj-RIB-In. Once the BGP speaker updates the Adj-RIB-In, the speaker shall run its Decision Process which consists in selecting routes for a subsequent advertisement by applying the policies in the local Policy Information Base (PIB) to the routes stored in its Adj-RIBs-In. The selected routes to be advertised to peers will be stored in the Adj-RIBs-Out.

In other words BGP is a policy-based shortest AS_Path vector routing protocol providing loop avoidance by detection, using the AS_Path information included in the BGP UPDATE messages. However, this exchanging of vectors of ASs (or AS_paths) will lead to a path exploration phenomenon. This phenomenon is the root cause of the observed delays in BGP convergence time.

This path exploration phenomenon is explained with reference to FIGS. 1A-1C. As shown schematically in FIG. 1A, at time t0, the destination D can be reached through node 2. At a time t1, node 2 sends advertisement UPDATE messages A:[2;D] to indicate to its peers that destination D can be reached using a path via node 2. This advertisement is received at node 1, and as a consequence thereof, node 1 updates its routing table at time t2 in order for the routing table to include the path [2;D]. Also, at time t3, node 1 will send a further advertisement A:[1,2;D] to its peers.

Figure 1A:
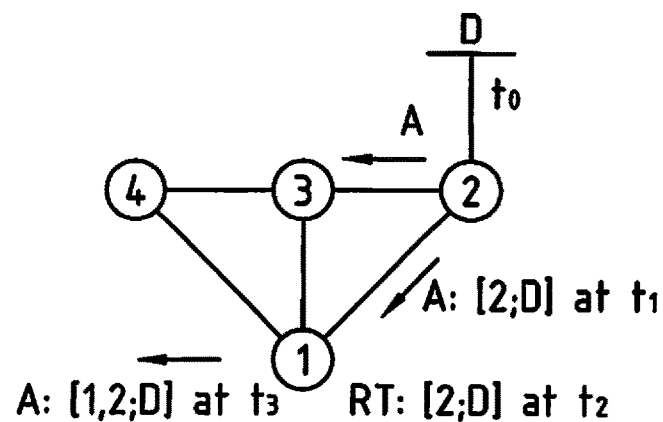
Figure 1B:
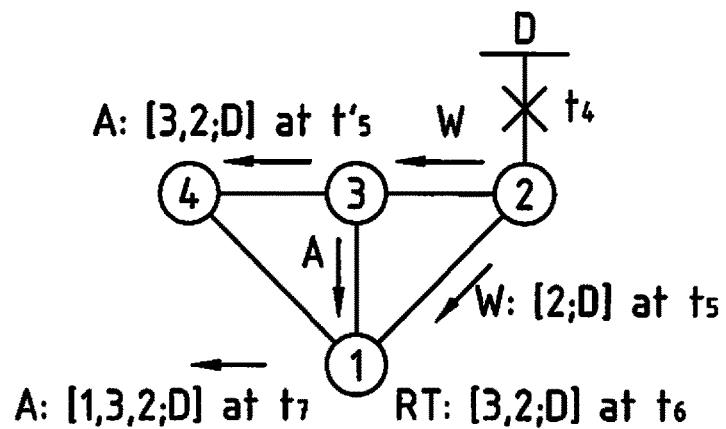

Referring to FIG. 1B, it is assumed that destination D can no longer be reached through node 2 at time t4. As a consequence, node 2 sends withdrawal UPDATE messages W:[2;D] to its peers (nodes 1 and 3) at time t5. However, as node 3 is not yet informed of the failure between node 2 and the destination, it has sent an advertisement UPDATE message A: [3,2;D] to node 1. Therefore, node 1 will delete [2;D] from its routing table, but will add [3,2;D]. Also, node 1 will send a further advertisement A:[1,3,2;D] at time t7 to its peers.

Figure 1C:
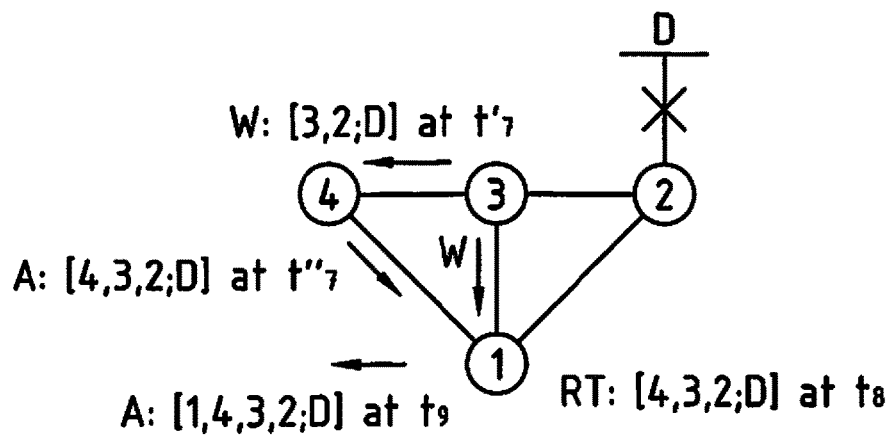

In a similar way, as illustrated in FIG. 1C, node 3 will send a withdrawal message W:[3,2;D] at time t7' to its peers. However, node 4 is not yet informed of the failure, and will advertise A:[4,3,2;D] at roughly the same time t7" to node 1. As a consequence, node 1 deletes the route [3,2;D] from its routing table, but adds the route [4,3,2;D] in its routing table at time t8. Further, at time t9, an advertisement UPDATE message A:[1,4,3,2;D] is sent by node 1 to its peers. It will be clear that such path exploration leads to very slow convergence.

In other words, BGP updates are not coordinated in space, notwithstanding the fact that, typically, nodes included in an AS_Path towards a particular destination prefix are correlated. Topological correlations in terms of nodes between different AS_Paths towards the same destination result from the meshedness of a typical Internet AS topology. This lack of coordination at the spatial level, coupled to the topological correlations between different paths, results in a transient phase during which each path towards the same destination is explored upon a topological change.

Path exploration can occur both when a destination is first advertised and when a destination is withdrawn:

at the destination advertisement time, the differential propagation/processing delays across the node topology may result into a suboptimal selection until the optimal path is being received.

at the destination withdrawal time, as illustrated in FIGS. 1A-1C, first a number of transient paths in between the BGP router originating the BGP withdrawal UPDATE message and the local BGP router are selected, until no other transient path exists.

In both cases for a given destination, the dependency between the first announcement/withdrawal at time t(i) and the newly selected path for the same destination at a time t(i+j) (j>0), results potentially in a transient exploration of all intermediate paths until reaching the next best preferred paths.

As will be explained in detail below an embodiment of the method of the invention provides a technique for path exploration sequences detection in order to enforce a suppression of sequences of inter-domain BGP routing updates that are detrimental to the routing system convergence. More in particular, according to an embodiment of the invention, the local BGP convergence time is decreased from t_convergence to a probabilistic time t_prob, wherein t_convergence=(Max_AS-Path−Min_AS-Path)×MRAI with MRAI being the minimum route advertisement interval, i.e. the interval between the advertisement UPDATE messages sent by a node; and t_prob=detection time+alternate best path selection time.

According to an embodiment of the invention, the path exploration phenomenon in BGP UPDATE sequences is detected. More in particular, it is determined whether an incoming AS_Path sequence is associated with a path exploration event or not. A further preferred step of this embodiment of the method of the invention consists in doing a learning step wherein the longest contiguous AS_Path subsequence associated to this event before reaching the end of the path exploration event is identified, to expectedly minimize the impact of the corresponding BGP updates on downstream neighbours. In the exemplary topology of FIG. 1A, during the learning phase, the "shortest path" [2;D] and "longest path" [4,3,2;D] for which the withdrawal is observed for each intermediary state, are determined. The longest differential subsequence is then [4,3]. During execution, after the learning phase, when the first element of the subsequence [4,3] is observed, the route selection process will remove any paths related to that sequence for reaching destination D. Note that also during execution, the learning may continue and the selection process may be further optimized.

According to a further development of this embodiment of the method, the BGP decision of the route selection process is anticipated upon path exploration event detection and identification (characterization). This will typically involve actions to suppress the churn on downstream nodes, such as selecting the alternate best AS_Path to be advertised to the BGP peers.

One of the underlying ideas leading to the invention is based on the realization that, during path exploration events, the BGP routing system transitions between different states and that this transition between the different states is governed by a Markov chain. However, this Markov chain is not directly observable, i.e. it is hidden, as the path exploration event results from an uninformed BGP update processing. Nevertheless, the received sequences of AS_Paths provide probabilistic information about the current state of the BGP routing system, or at least of the upstream part of the network that is of interest.

According to an embodiment of the invention, a Hidden Markov Model (HMM) is used wherein use is made of a BGP routing system state which is representative of the effect of all BGP UPDATE message exchanges on the incoming BGP communication channel and thus on the local BGP decision process. The local router decision process has no direct access to or knowledge of the global routing system state, and hence the routing system status model is a hidden variable. This hidden variable can only be perceived by the local router through the sequence of observations as produced by the BGP communication channel whose sequential output represents the sequence of AS_Paths as received by the local route selection process from the incoming BGP UPDATE messages.

To include the case where the observation is a probabilistic function of the state, i.e., the resulting model is a doubly embedded stochastic process with an underlying stochastic process that is not observable (it is hidden) but can only be observed through another set of stochastic processes that produce the sequence of observations, the model is extended to the Hidden Markov model (HMM). Such a model represents stochastic sequences as Markov chains where the states are not directly observed but are associated with a probability density function (pdf).

The generation of a random sequence is then the result of a random walk in the chain (i.e. the browsing of a random sequence of states and of a draw (called an emission) at each visit of a state. The sequence of states, which is the quantity of interest can be observed through the stochastic processes defined into each state (i.e. typically the parameters of the pdfs of each state must be known before being able to associate a sequence of states Q to a sequence of observations O). The true sequence of states is therefore hidden by a first layer of stochastic processes.

According to a preferred embodiment of the invention, a Hidden Markov Model (HMM) is used for the detection of a path exploration event. Before explaining in detail how the HMM is used in the present invention, the theory of discrete Markov chains will be briefly reviewed for a better understanding of the invention. Further reference is made to an article by R. Rabiner entitled "A Tutorial on Hidden Markov Models and Selected Applications in Speech Recognition", Proceedings of the IEEE, Vol. 77, No. 2, February 1989.

Discrete Markov Chains

Consider a system which may be described at any time as being one of a set of N distinct states ($S_1, S_2, \ldots, S_N$). At regularly spaced discrete times, the system undergoes a change of state according to a set of probabilities associated with the state. Typically, such a system is characterized by a set of state transition probabilities $$A_{ij}=P(q_j \text{ at time } t+1|q_i \text{ at time } t)=P(q_{j,t+1}|q_{i,t}) \quad \text{(Eq1)}$$

wherein $1 \leq i, j \leq N$, and such that $\Sigma_{j=1}^{N} \alpha_{ij}$, and wherein $q_j$ at time $t+1$ means that the actual state is equal to $S_j$ at time $t+1$, and wherein $q_i$ at time t means that the preceding actual state was $S_i$ at time t.

This stochastic process can be referred to as an observable Markov model since the output of the process is the set of states at each instant of time, wherein each state corresponds to a physical (observable) event.

Hidden Markov Model

The Hidden Markov Model (HMM) with N hidden states and M distinct observation symbols per state that correspond to the physical output of the system being modelled, is defined by three probability distributions:

(State) Transition probability distribution $A=\{a_{ij}\}$ with $a_{ij}$ the probability to go from a state i ($q_i$) to a state j ($q_j$) is given by $P(q_j$ at time $t+1|q_i$ at time $t)=P(q_{j,t+1}|q_{i,t})$ with $1 <= i,j <= N$;

Observation probability distribution: $B=\{b_j(O)\}$, where $b_j(O)=P(O$ at time $t|q_j$ at time $t)=P(O_t|q_{j,t})$, i.e. $b_j$ the probability distribution of emitting an observation vector O in state j. In the discrete case, each observation $O_t$ takes its values from the library of M observation symbols corresponding to the physical output of the system being modelled. The emission probabilities are the pdfs that characterize each state $q_j$.

Initial state distribution: $\pi=\{\pi i\}$ where $\pi_i = P(q_i$ at $t=1) = P(q_{i,1})$ gives the initial probabilities.

There are three basic problems that must be solved for the model $\lambda=(A,B,\pi)$ to be useful in real-world applications.

Problem 1: Given the observation sequence $O=O_1, O_2, \ldots, O_T$, and the model $\lambda=(A,B,\pi)$, the problem is to compute $P(O|\lambda)$, the probability of the observation sequence O, given the model $\lambda$. This problem is typically solved by the Forward and Backward algorithms.

Problem 2: Given the observation sequence $O=O_1, O_2, \ldots, O_T$, and the model $\lambda=(A,B,\pi)$, find the optimal state sequence $Q=q_1, q_2, \ldots, q_T$ associated with the given observation sequence. A formal technique for finding the single best state sequence (that maximizes $P(Q|O)$ given the model $\lambda$) exists based on dynamic programming methods, called the Viterbi algorithm.

Problem 3: Determine a method to adjust the model parameters A, B, and $\pi$ to maximize the probability of the observation sequence O given the model. There is no known way to analytically solve for the model which maximizes the probability of the observation sequence. In fact, given any finite observation sequence as training data, there is no optimal way of estimating the model parameters. One can, however, choose $\lambda=(A,B,\pi)$ such that $P(O|\lambda)$ is locally maximized using an iterative procedure such as the Baum-Welch method.

HMM Used in an Embodiment of the Invention

HMM models the probability of the simultaneous occurrence of the observations O and routing system events Q, that is, it is a representation of the joint distribution P(O,Q). Our problem consists in classifying observed AS-Path sequences with as purpose the accelerated detection of path exploration sequences and subsequent selection (or generation) of the adequate AS-Path after a minimum number of path exploration hits have been reached.

Each state of the BGP routing system is modelled as HMM state. Four or five hidden states are defined for the HMM. The output of the HMM populates the Loc-RIB. Note that the model can be applied per destination prefixes or cluster of prefixes.

Observations O are modelled as AS-Paths as received by the BGP route selection process thus, before execution of the BGP route selection process. Note that AS-Path attribute information is extracted on a per-destination prefix basis. If we define:

A: announcement of a prefix (with no change in AS-path or attributes);

$A^+$: announcement of a prefix with an increasing AS-path length (update to longer AS-Path);

$A^*$: announcement of a prefix with the same AS-path but different attributes (update of attributes);

$A^0$: announcement of a prefix with a different path of the same length (update to a different AS-Path of same length);

W(A): withdraw of an AS-Path A for a given prefix.

Then, a prevalent form of path exploration is the sequence of increasing AS path length (for an already announced prefix), followed by a withdrawal W, those observations being closely coupled in time: A, $\{A^+, A^0, A^*\}$, W. The $A^+$, $A^0$ and $A^*$ updates are intermediate updates representing transient routing states. The general sequence of announcement/withdrawal of interest, i.e., that is characteristic of path exploration event, can be represented as follows:

$A_0$, $W(A_0)$, $\{A^+, A^0, A^*\}_1$, $W(A_1)$, $\{A^+, A^0, A^*\}_2$, $W(A_2)$, ...

Generally, this sequence can either terminate with a withdrawal or stabilization to a newly preferred best path defined as A, $\{A^+, A^0, A^*\}^c$ where c is a positive integer value indicating the repetition of one of the events taken from the set $\{A^+, A^0, A^*\}$, and where the minimum value of the integer c is 1 and the maximum value of the integer c is n−1. Indeed, during the path exploration phenomenon the local AS may explore all states from cycles of length $C_2$ (Min_AS-Path+1) to $C_{n-1}$ (Max_AS-Path).

At this point in time it is noted that such sequences of AS-paths are the result of the BGP route selection process that populates the Loc-RIB. The actual sequence of incoming BGP routing updates as maintained in the Adj-RIB-In is, e.g., of the form Adj-RIB-in:$A_0$, $\{A^+, A^0, A^*\}_1$, ..., $\{A^+, A^0, A^*\}_m$, $W(A_0)$, $W(A_1)$, ..., $W(A_{m-1})$, $W(A_m)$ For the example of FIG. 1A-C, at consecutive moments in time, the following observations are put in the Adj-RIB-In for destination D, as illustrated in FIGS. 2 and 3:

Adj-RIB-In: [2], [3,2], W[2], [4,3,2], W[3,2], W[4,3,2]

The corresponding AS-Paths as selected by the BGP route selection process according to the prior art is:

Loc-RIB: $A_0$, $\{A_0\}_1$, ..., $\{A_0\}_m$, $A_1$, $A_2$, ..., $A_m$,none

For the example of FIGS. 1A-C, the selected paths for destination D at consecutive moments are illustrated in FIG. 2:

Loc-RIB: [2], [2], [3,2], [3,2], [4,3,2], none

The sequence of announcement/withdrawal as advertised by the local BGP router to its downstream neighbours is (where $A_1=\{A^+, A^0, A^*\}_1$, ..., $A_m=\{A^+, A^0, A^*\}_m$)

Adj-RIB-Out: $A_0$, $\{A_0\}_1$, ..., $\{A_0\}_m$, $W(A_0, A_1, W(A_1)$, ..., $W(A_{m-1})$, $A_m$, $W(A_m)$

For the example of FIGS. 1A-C, the advertised paths for destination D are illustrated in FIG. 2:

Adj-RIB-Out: [1,2], [1,2], W[1,2], [1,3,2], [1,3,2], W[1,3,2], [1,4,3,2], W[1,4,3,2]

According to an embodiment of the invention, once the Adj-RIB-In pattern is known, the purpose is to detect as part of the flow of incoming BGP UPDATEs, the AS-path (sequence) that will lead to such pattern of outgoing BGP UPDATEs. In other words, it is desirable to determine the most probable state sequence for reaching a "path exploration hit" given a certain observation sequence O: P(q|O). The corresponding observation sequence is then removed from the BGP route selection process such as to directly lead to a BGP UPDATE that does not expose the transient local decisions.

The actual sequence of incoming BGP routing updates as maintained in the Adj-RIB-In can be the same as for the prior art: $A_0$, $\{A^+, A^0, A^*\}$, . . . , $\{A^+, A^0, A^*\}_m$, $W(A_0$, $W(A_1)$, . . . , $W(A_{m-1})$, $W(A_m)$.

By detecting that the observation sub-sequence $\{A^+, A^0, A^*\}_1$, . . . , $\{A^+, A^0, A^*\}_m$, $W(A_0)$, . . . , $W(A_m)$ is part of an exploration sequence, the corresponding AS-Path as selected by the BGP route selection process is the one given by the following sequence of announcements:

Loc-RIB: $A_0$, $\{A_0\}_1$, . . . , $\{A_0\}_m$, none

For the example of FIGS. 1A-C, when using an embodiment of the method of the invention, the selected paths for destination D at consecutive moments are illustrated in FIG. 3:

Loc-RIB: [2],[2], none

The sequence of announcement/withdrawal as advertised by the local BGP router to its downstream neighbours would then become Adj-RIB-Out: $A_0$, $\{A_0\}_1$, . . . , $\{A_0\}_m$, $W(A_0)$ For the example of FIGS. 1A-C, when using an embodiment of the method of the invention, the advertised paths for destination D are illustrated in FIG. 2:

Adj-RIB-Out: [1,2], [1,2], W[1,2]

FIG. 4A show another exemplary topography comprising a number of additional nodes (nodes 5-9) when compared with the example of FIGS. 1A-C. In this example, during the learning phase illustrated in FIG. 4B, the subsequence [5,4,3] was identified. During the normal execution illustrated in FIG. 4C, the following paths are selected to be put in the Loc-RIB: [2], [3,2], [6,7,8,9];
Adj-RIB-Out: [1,2], W[1,2], [1,3,2], W[1,3,2], [6,7,8,9]

Note that here the path [3,2] is not immediately withdrawn as was the case in the example of FIG. 3. Depending on the learning phase, it may be that (in order to reduce false positives) when an exploration event occurs, this is not immediately certain (such condition occurs typically as a result of a policy change not correlated to a topological change). In such a case, a path, such as path [3,2] in the example of FIGS. 4A-C, may be selected although this path is in fact no longer available. However, the detrimental effects of path exploration are largely reduced as is clear from the fact that [4,3,2] and [5,4,3,2] are removed, immediately converging to [6,7,8,9].

Embodiment of HMM to Model Routing System

According to an embodiment of the invention, the HMM proposed to model routing system states per destination prefix or per set of destination prefixes undergoing the same state transitions, is characterized as follows:

N (the number of hidden states in the model): 4 or 5
These four states are defined as follows, see also FIG. 5:
State_1 (S1): No AS_Path change,
State_2 (S2): Re-initialization,
State_3 (S3): AS_Path Increase,
State_4 (S4): Path Exploration Hit.

These states actually characterise hidden global routing states that are not directly observable at the local BGP router. The term "global" shall be understood here as the part of the routing system that is "upstream" to local router with respect to the ASs involved in the path exploration event.

To further improve the model a fifth state S5 could be added to account for "exploration-less" withdrawals: typically, not all withdraws should be considered as part of a state sequence leading to a path exploration hit. Indeed, the HMM should typically account that only $W(A_0)$ is a trigger for exploration hit, withdraws of intermediate states associated to announcements $A_1$, . . . , $A_m$ occurring before $W(A_0)$ shall not be considered part of an exploration sequence. Taking this effect into it account would lead to introduce a fifth state in our model.

M (the number of distinct observation symbols per state): these symbols correspond to the AS sequences received in BGP UPDATE messages, stored in the Adj-RIB-In, and processed by the BGP route selection process that populates the Loc-RIB.

A: the state transition probability distribution $a_{ij} = P(q_{j,t+1}|q_{i,t})$ with $1<=i,j<=N$ correspond to the individual state transition of the routing system state.

B: the observation probability distribution in state j, $b_j(O)=P(O_t|q_{j,t})$.

$\pi$: the initial state distribution

The initial parameters of A, B and $\pi$ can be determined using techniques well known to the skilled person. A and $\pi$ are typically uniformly selected, while for B maximum likelyhood and k-means are the most used techniques.

Learning Model and Classifying AS-Path Sequences

A classifier is a function h that maps observed AS-paths (O) to BGP state event classes. The goal of the learning process is to find a function h that correctly predicts the class h(O) of new AS-path(s).

A training example for this learning process is a pair (O,q), where q refers to the state and is associated with a label. Reference will be made to a set of N such examples as the training data. The training data actually consist of sequences of (O,q) pairs. These sequences exhibit sequential correlation which is characteristic for the path exploration phenomenon. That is, nearby O and q values are likely to be related to each other. For example, before occurrence of a topological change, all of the q label values will be "no AS-Path change". Afterwards, all of the q label values will be "AS-Path increase". Such patterns can be exploited to improve the prediction accuracy of the classifier. In the present case, it is possible to explore sequences by looking at the distribution of typical (legitimate) sequences and then to see that this distribution changes when the BGP routing state changes. The goal is to construct a classifier h that can correctly predict a new label sequence q=h(O) given an input sequence O.

Assume that the cost function L(i,j) gives the cost of assigning state label value i to an example whose true label is j. The goal is to find a classifier h with minimum expected cost. The cost function assesses the penalties associated to selection of BGP routes that contain (part of) the path exploration sequence: missed path exploration events, false positive detections (the classification declares a path exploration event when in reality there is none; such an error may typically occur when decision is taken too rapidly) and false negative detections (the classification does not declare an event to be a path exploration event when in reality it is; such an error typically occurs when the decision is taken too slowly).

As the HMM is a representation of the joint probability density estimator P(O,Q), it can be used to compute the probability of any particular state q given any particular observation sequence O using conditional probability density estimator P(Q|O). Classification a new observation sequence O is then performed by selecting the class with the minimum expected cost as provided by the formula (see also problem 2 defined above in the section about HMM) that predicts the optimal value q' given the observation O:

$$q'=\arg\min_{q_i}\Sigma_{q_j}P(q_j|O)L(q_i,q_j)$$

Incorporating the cost function into the classification task of AS-Path sequences consists thus in predicting the (conditional) joint distribution of all of the (state) labels in the output sequence: $P(q_j|O)$. If this joint distribution can be accurately predicted, then the cost function can be evaluated, and the optimal decisions can be chosen for the observation sequence O.

In practice, as the length T of the sequences can be very long, the direct evaluation of this equation requires $O(N^T)$ probability evaluations (where N is the number of labels) which can be impractical. However, when the cost function depends on the entire sequence, i.e., the cost function is only concerned with classifying the entire sequence, this computation can be performed in $O(N^2L)$ time, where L is the length of the observation sequence O. In this case, finding the q' with the highest probability consists in computing:

$$q'=\arg\max_{q_i}P(q_i|O)$$

This expression can be computed by means of the Viterbi algorithm which corresponds to the second HMM problem. Computation (by application of the Bellman's dynamic programming algorithm) consists in assigning for each class and each time step of a time interval [0,t], the probability of the most likely state transition sequence. When the algorithm reaches the end of the sequence, it has computed the most likely path from time 0 to time t and its probability. In other terms, by determining the most probable state sequence given a certain observation sequence O, one can isolate observation sequence corresponding to "path exploration hit" and remove their difference from the BGP route selection process.

Simplified Embodiment of a Router System of the Invention

Finally FIG. 6 illustrates an embodiment of a router system according to the invention, wherein only the parts relevant for the present invention have been shown. The router system uses a RIB 11 which is updated by a processing means 12 using amongst others information from a states data base 14 and a policy information base 15. The processing means 12 comprises a HMM function 13 for determining if a path is associated with a path exploration event in order to be able to make an appropriate selection of the paths to be placed in the Loc-RIB and the Adj-RIB-Out. This is done by a decision means 16 comprising a selection function.

While the principles of the invention have been set out above in connection with specific embodiments, it is to be clearly understood that this description is merely made by way of example and not as limitation of the scope of protection which is determined by the appended claims.

The invention claimed is:

1. A method for use in updating a routing table of a router of a plurality of routers, the routing table comprising at least one route to be used for at least one destination, wherein update messages with routing information are sent between the plurality of routers wherein at the router the method comprises:
receiving an update message including path information indicating a new path or a withdrawal of a path for a destination;
determining if the received path information is associated with a path exploration event, the path exploration event is associated with a number of non-optimal transient paths, the determining including using a generative stochastic signal model, the generative stochastic signal model including a Hidden Markov Model (HMM);
identifying a longest contiguous path sequence from the transient paths of the path exploration event;
updating the routing table in accordance with results of the determination and an identified sequence for determining whether the path information contained in the received update message is used; and
generating routing information to be included in update messages to be sent to the other routers of the plurality of routers, in accordance with the result of the determination, wherein the HMM includes,
a number N of hidden states $S_i$ with $1\le i\le N$, the number of hidden states characterizing routing states of a group of routers upstream of the router, which group is associated with a path exploration event,
a number M of observation symbols O per hidden state, the observation symbols corresponding to the path sequences received in the update messages,
a state transition probability distribution $a_{ij}=P(q_{i,t+1}|q_{i,t})$ with $1\le i, j\le N$,
wherein $P(q_{j,t+1}|qi_{,t})$ is the probability that an actual state at time t+1 is equal to $S_j$, and that a preceding actual state at time t was $S_i$ at time t,
an observation probability distribution in state j, $b_j(O)=P(O_t|q_{i,t})$ with $1\le j\le N$, $P(O_t|q_{i,t})$ being a probability of emitting an observation O at time t in an actual state $q_j$ at time t, and
an initial state distribution $\pi_i=P(q_{i,1})$ with $1\le i\le N$, $P(q_{i,1})$ being a probability of having an initial state $S_i$.

2. The method of claim 1, wherein, if the received update message advertises a new path and the results of the determination indicate that the new path is associated with a path exploration event, the determining comprises not including the new path in the routing table.

3. The method of claim 2, wherein, the determining comprises not including the new path in update messages to be sent to the other routers of the plurality of routers.

4. The method of claim 1, wherein
the generative stochastic signal model uses a plurality of states to model a plurality of communication channels, the plurality of communication channels having outputs being used to select the path to be used for the destination; and
the received update message and information in the routing table are used to provide probabilistic data on the states.

5. The method of claim 1, wherein the router is a BGP router having a plurality of BGP router peers and a Routing Information Base (RIB) comprising:

an Adj-RIBs-In configured to store routing information from inbound update messages;

a Loc-RIB configured to store the routing table; and an Adj-RIBs-Out configured to store the routing information to be included in update messages to be sent to the plurality of BGP router peers;

wherein a path sequence included in the received update message is stored in the Adj-RIBs-In;

wherein the Loc-RIB and the Adj-RIBs-Out are updated in accordance with the result of this determination.

6. The method of claim 1, wherein the number of hidden states comprise:

a first state $S_1$ indicating that there is no change in the path;

a second state $S_2$ indicating a re-initialization;

a third state $S_3$ indicating an increase of a length of the path;

a fourth state $S_4$ indicating presence of a path exploration event.

7. The method of claim 6, wherein the update message includes an announcement of a path containing a number of path attributes or a withdrawal of a path, and wherein the observation symbols comprise:

an announcement A of a destination with no change in path or path attributes;

an announcement A+ of a destination with a path having an increased path length;

an announcement A* of a destination with the same path but different path attributes;

an announcement $A^D$ of a destination with a different path of the same length;

a withdrawal W(A) of a path A for a given destination.

8. A router having a routing table comprising the route(s) to be used for at least one destination, wherein the router is adapted to send and receive update messages with routing information, comprising:

at least one processor, the at least one processor configured to, receive an update message containing path information indicating a new path or a withdrawal of a path for a destination;

determine if the received path information is associated with a path exploration event, the path exploration event is associated with a number of non-optimal transient paths, the determination including using a generative stochastic signal model, the generative stochastic signal model including a Hidden Markov Model (HMM);

identify a longest contiguous path sequence from the transient paths of the path exploration event;

update the routing table in accordance with results of the determination and an identified sequence for determining whether the path information contained in the received update message is used; and a routing information base (RIB) including, a Loc-RIB routing table, an Adj-RIB_In configured to store the received path information, and an Adj-RIB-Out; wherein the at least one processor is further configured to not store the received path information in the Loc-RIB routing table and in the Adj-RIB-Out if the received path information is associated with the path exploration event, and the HMM includes, a number N of hidden states $S_i$ with $1 \leq i \leq N$, the number of hidden states characterizing routing states of a group of routers upstream of the router, which group is associated with a path exploration event, a number M of observation symbols O per hidden state, the observation symbols corresponding to the path sequences received in the update messages, a state transition probability distribution $a_{ij} = P(q_{i,t+1} | q_{i,t})$ with $1 \leq i, j \leq N$, wherein $P(q_{i,t+1} | qi_{,t})$ is a probability that an actual state at time t+1 is equal to $S_j$, and that a preceding actual state at time t was $S_i$ at time t, an observation probability distribution in state j, $b_j(O) = P(O_t | q_{j,t})$ with $1 \leq j \leq N$, $P(O_t | q_{i,t})$ being a probability of emitting an observation O at time t in an actual state $q_i$ at time t, and an initial state distribution $\pi_i = P(q_{i,1})$ with $1 \leq i \leq N$, $P(q_{i,1})$ being a probability of having an initial state $S_i$.

9. The method of claim 1, wherein the number N is at least 4.

10. The method of claim 6, wherein the number of hidden states further includes a fifth state indicating a withdrawal of a path which does not lead to a path exploration event.

* * * * *